United States Patent
Subramanian et al.

(10) Patent No.: US 10,540,643 B2
(45) Date of Patent: Jan. 21, 2020

(54) INTERCHANGE RATE PROCESSING SYSTEM AND METHOD

(71) Applicant: MasterCard International Incorporated, Purchase, NY (US)

(72) Inventors: Shankar Subramanian, Dardenne Prairie, MO (US); Timothy Glen Althoff, O'Fallon, MO (US); Peter Julian Reyes Flor, O'Fallon, MO (US); Marilyn Haqq, Florissant, MO (US); Gregory S. Kriebaum, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 615 days.

(21) Appl. No.: 15/130,718

(22) Filed: Apr. 15, 2016

(65) Prior Publication Data

US 2017/0300879 A1 Oct. 19, 2017

(51) Int. Cl.
*G06Q 20/08* (2012.01)
*G06Q 20/10* (2012.01)
*G06Q 20/12* (2012.01)
*G06Q 20/34* (2012.01)

(52) U.S. Cl.
CPC .......... *G06Q 20/102* (2013.01); *G06Q 20/12* (2013.01); *G06Q 20/34* (2013.01)

(58) Field of Classification Search
USPC ........................................................ 705/39
See application file for complete search history.

(56) References Cited

U.S. PATENT DOCUMENTS

| 8,095,438 | B2 | 1/2012 | Carroll et al. |
| 8,266,057 | B2 | 9/2012 | Carroll et al. |
| 8,560,393 | B2 | 10/2013 | Giordano et al. |
| 8,768,831 | B2 | 7/2014 | Mohsenzadeh |

(Continued)

OTHER PUBLICATIONS

Competition and Credit and Debit Card Interchange Fees: A Cross-Country Analysis Fumiko Hayashi and Stuart E. Weiner* (Year: 2005).*

(Continued)

*Primary Examiner* — William E Rankins
(74) *Attorney, Agent, or Firm* — Armstrong Teasdale LLP

(57) ABSTRACT

Systems and methods for interchange rate processing are provided. An interchange rate processing computing device is configured to receive transaction messages from one or more acquiring banks. Each transaction message may contain transaction data corresponding to a payment card transaction. The interchange rate processing computing device may analyze the transaction data to identify one or more one or more transaction characteristics. Based on the transaction characteristics, the interchange rate processing computing device may identify a lowest valid interchange rate for the payment card transaction and determine a corresponding interchange rate designator. The interchange rate processing computing device may then generate an enhanced transaction message including the transaction data and the interchange rate designator and transmit the enhanced transaction message to a payment processor, issuing bank, or other entity in a payment processing network.

21 Claims, 4 Drawing Sheets

(56) References Cited

U.S. PATENT DOCUMENTS

| | | |
|---|---|---|
| 8,886,563 B2 | 11/2014 | Sakata et al. |
| 9,087,330 B2 | 7/2015 | Murphy et al. |
| 2009/0171839 A1 | 7/2009 | Rosano et al. |
| 2009/0234748 A1 | 9/2009 | Skowronek et al. |
| 2009/0266881 A1* | 10/2009 | Hammad ............... G06Q 20/04 235/380 |
| 2011/0313869 A1* | 12/2011 | McAlhaney ........... G06Q 20/20 705/16 |
| 2012/0078790 A1 | 3/2012 | Ornce et al. |
| 2012/0158566 A1 | 6/2012 | Fok et al. |
| 2013/0013441 A1 | 1/2013 | Giordano et al. |
| 2014/0025578 A1 | 1/2014 | Evans |
| 2014/0081780 A1 | 3/2014 | Murphy et al. |
| 2014/0108166 A1 | 4/2014 | Murphy et al. |
| 2014/0108167 A1 | 4/2014 | Murphy et al. |
| 2014/0108168 A1 | 4/2014 | Murphy et al. |
| 2014/0129358 A1* | 5/2014 | Mathison ............. G06Q 20/027 705/17 |
| 2014/0136412 A1 | 5/2014 | Evans |
| 2014/0279524 A1* | 9/2014 | Slusser ................. G06Q 20/42 705/44 |
| 2015/0039501 A1 | 2/2015 | Evans |
| 2015/0120561 A1* | 4/2015 | Ver Hulst ............. G06Q 40/02 705/44 |
| 2015/0206120 A1 | 7/2015 | Murphy et al. |
| 2016/0140475 A1* | 5/2016 | Ghosh ............. G06Q 10/06395 705/7.41 |

OTHER PUBLICATIONS

PCT International Search Report, Application No. PCT/US2017/022053, dated Jun. 9, 2017, 5 pps.

* cited by examiner

INTERCHANGE RATE PROCESSING SYSTEM AND METHOD

BACKGROUND

The field of the invention relates generally to enhancing computer messages in payment processing systems, and more particularly to receiving transaction messages, applying stored rules to data contained in the transaction messages, and enhancing the transaction messages with interchange rate information obtained by applying the stored rules.

Payment cards are a convenient and easy way for a merchant to accept payment from cardholders for goods and services provided by the merchant. Processing of payment card transactions generally requires involvement by various entities and institutions including the merchant's acquiring bank, the payment processor associated with the payment card, and the cardholder's issuing bank. As a result, merchants are generally charged fees for accepting payment card transactions which may be divided among the acquiring bank, the issuing bank, and the payment processor for the services they provide.

Interchange fees, for example, are applied to each payment card transaction and are generally paid by the merchant to the cardholder's issuing bank. Interchange fees are generally intended to reimburse the issuing bank for the cost of providing payment card services and processing payment card transactions. Interchange fees are also intended to cover the inherent risk in the issuing bank's role in a payment card transaction. Specifically, the issuing bank provides funds to the merchant on credit to the cardholder under the assumption that the cardholder will repay the issuing bank when the cardholder's payment card statement comes due. Accordingly, interchange fees are intended, at least in part, to cover the possibility that a cardholder will fail to or be unable to reimburse the issuing bank.

Interchange fees are generally assessed based on an interchange rate which may be one or both of a percentage of a transaction and a flat fee. The interchange rate for a particular transaction may vary significantly based on characteristics of the transaction. Transaction characteristics that may influence the interchange rate include, but are not limited to, whether the payment card transaction was made with a debit or credit card; the amount of the transaction; the nature of the goods and services purchased; whether the transaction was conducted online or at a brick and mortar location such that the payment card was physically presented; the payment program or service enrolled in by the merchant; whether the transaction was processed entirely electronically; and the location of the transaction (e.g., domestic or international).

In known systems, the process of determining an interchange rate is commonly referred to as interchange qualification and generally occurs during a transaction clearing process. During interchange qualification, an acquiring bank analyzes transaction data for a given transaction and determines an applicable interchange rate. The acquiring bank generally performs interchange qualification using a specialized interchange qualification computing system configured to apply rules to determine the applicable interchange rate. The rules are typically created by the payment processor of the issuing bank. After the acquiring bank determines the appropriate interchange rate, the acquiring bank adds an interchange rate designator (IRD) corresponding to the interchange rate to the transaction data. Based on the IRD, the payment card processor and/or issuing bank determine which interchange rate to apply and the amount to which the payment processor or issuing bank is entitled during a settlement process.

Known systems and methods for processing interchange fees present various problems and inefficiencies. An acquiring bank may err when identifying or inserting an IRD. For example, the acquiring bank may insert an invalid IRD, insert an incorrect IRD, or, in cases where a particular transaction may meet criteria for more than one IRD, insert an IRD corresponding to a higher interchange rate than is required. As a result of such errors, a merchant may be assessed greater fees than necessary or may have transaction data rejected. If transaction data is rejected, correcting and reprocessing the transaction data may require significant time and network bandwidth, leading to unnecessary costs for the acquiring bank.

In known systems in which acquiring banks perform interchange qualification, each acquiring bank must maintain its own system for analyzing transaction data including one or more systems for storing, updating, and applying interchange qualification rules. Moreover, payment processors frequently introduce new payment card products, cease offering payment card products, adjust interchange rates, and the like, each of which may require updating an acquiring bank's interchange qualification system. Accordingly, acquiring banks and institutions seeking to become acquiring banks are subject to significant capital investments and operating expenses to establish, maintain, and operate interchange qualification systems.

In known systems payment processors must also regularly disseminate interchange rate schedules to acquiring banks describing the transaction characteristics applicable to different interchange rates. Given the broad range of payment card products offered by payment processors and the number of acquiring banks that may be in a payment processor's network, even minor changes to an interchange rate schedule may require significant bandwidth and time to disseminate. Moreover, even if an updated interchange rate schedule is disseminated to an acquiring bank, there is no guarantee that the acquiring bank will update its interchange qualification systems correctly and in a timely manner.

In light of the above, a new system and method for processing interchange rates in a payment processing network is needed that resolves the inefficiencies and negative implications of known systems in which acquiring banks conduct interchange qualification.

BRIEF DESCRIPTION OF THE DISCLOSURE

In one aspect, an interchange rate processing (IRP) computing device comprising one or more processors in communication with one or more memory devices is provided. The interchange rate processing computing device is configured to: receive a transaction message including transaction data corresponding to a payment card transaction initiated by a cardholder with a merchant using a payment card; identify one or more transaction characteristics of the payment card transaction from the transaction data; determine a lowest valid interchange rate for the payment card transaction based at least in part on the one or more transaction characteristics; generate an enhanced transaction message by inserting an interchange rate designator corresponding to the lowest valid interchange rate into the transaction data; and transmit the enhanced transaction message.

In another aspect, a computer-implemented method for interchange rate processing is provided. The method is implemented by an IRP computing device and includes:

receiving a transaction message including transaction data corresponding to a payment card transaction initiated by a cardholder with a merchant using a payment card; identifying one or more transaction characteristics of the payment card transaction from the transaction data; determining a lowest valid interchange rate for the payment card transaction based at least in part on the one or more transaction characteristics; generating an enhanced transaction message by inserting an interchange rate designator corresponding to the lowest valid interchange rate into the transaction data; and transmitting the enhanced transaction message.

In another aspect, a non-transitory computer-readable storage media having computer-executable instructions embodied thereon is provided. When executed by at least one processor, the computer-executable instructions cause the at least one processor to: receive a transaction message including transaction data corresponding to a payment card transaction initiated by a cardholder with a merchant using a payment card; identify one or more transaction characteristics of the payment card transaction from the transaction data; determine a lowest valid interchange rate for the payment card transaction based at least in part on the one or more transaction characteristics; generate an enhanced transaction message by inserting an interchange rate designator corresponding to the lowest valid interchange rate into the transaction data; and transmit the enhanced transaction message.

DETAILED DESCRIPTION OF THE DISCLOSURE

Figure 1:
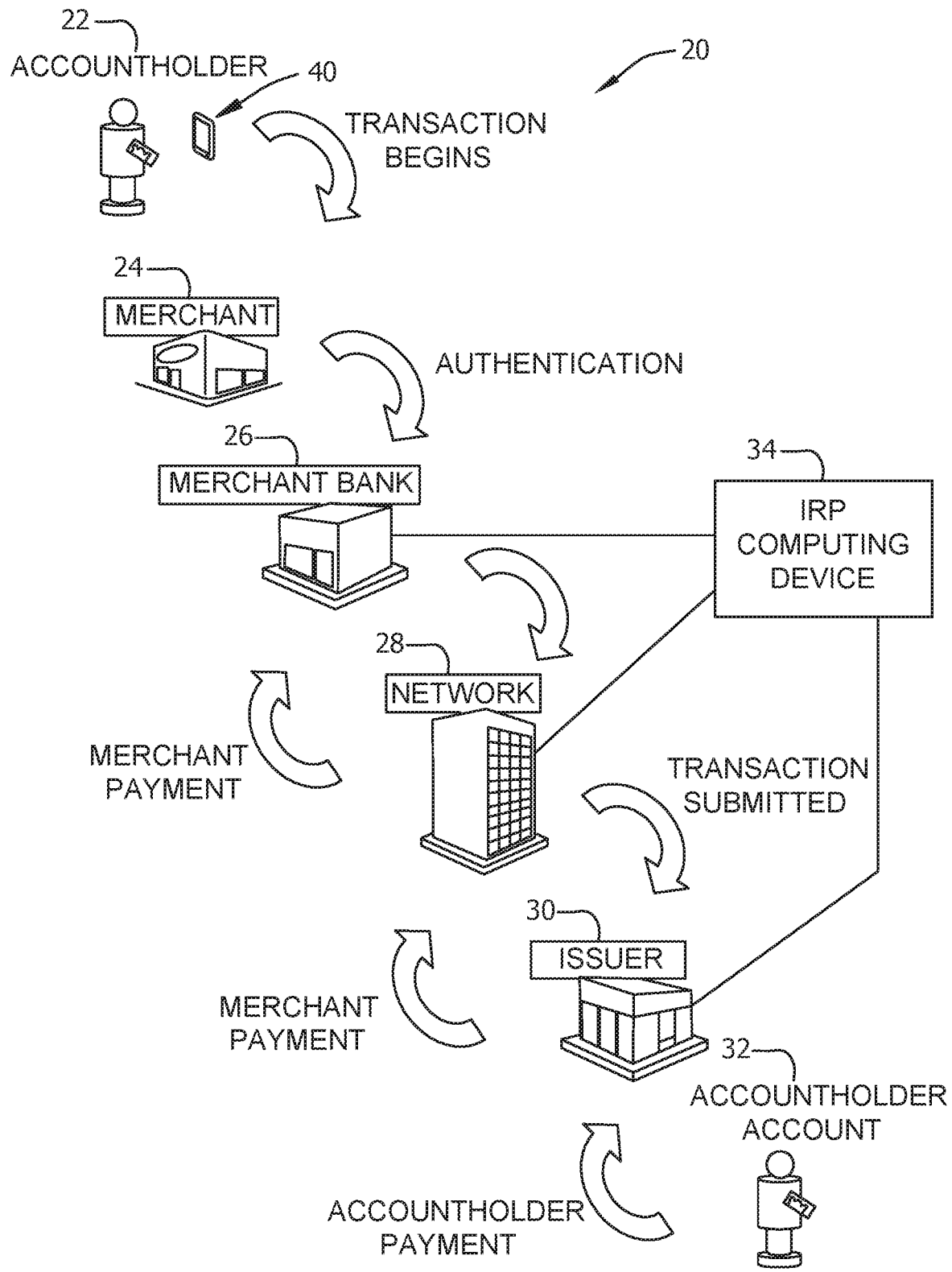
FIG. 1 is a schematic diagram illustrating an example of a multi-party payment processing system in communication with an interchange rate processing computing device for processing payment card transactions in accordance with the present disclosure.

The interchange rate processing (IRP) computing device and associated methods described herein resolve many of the issues and inefficiencies in known interchange qualification systems. IRP computing devices in accordance with this disclosure are generally associated with (i.e., part of or in communication with) a payment processor or are stand-alone computing devices in communication with a plurality of acquiring banks. As a result, IRP computing devices in accordance with this disclosure result in several significant improvements over known interchange qualification systems including reducing expenses of acquiring banks, lowering barriers to entry for institutions seeking to become acquiring banks, improving accuracy and reliability of interchange qualifications, and improving overall payment network efficiency by reducing network bandwidth required for resolving invalid or incorrect IRDs and disseminating updated interchange rate schedules.

In IRP systems described herein, one or more acquiring banks transmit transaction messages containing transaction data to an IRP computing device. Transaction data generally corresponds to data collected or generated during a payment card transaction. Transaction messages include, but are not limited to, authorization messages, clearing messages, and settlement messages. An acquiring bank may transmit transaction messages to the IRP computing device directly or through one or more intermediate computing devices. In certain embodiments, transaction message may be transmitted to the IRP computing device as part of a clearing process for one or more payment card transactions. In such embodiments, multiple transaction messages may be transmitted in bulk to the IRP computing device. In certain embodiments, transaction messages may be submitted to the IRP computing device using the ISO 8583 message protocol, which is typically used for sending authorization, clearing, and settlement messages over a payment processing network.

IRP computing devices in accordance with this disclosure may perform interchange qualification for a payment card transaction corresponding to a transaction message. To do so, an IRP computing device may analyze the transaction data contained in the transaction message and identify transaction characteristics of the payment card transaction. The IRP computing device may then apply interchange schedule data, which is generally stored in the form of rules or data tables accessible by the IRP computing device, to the transaction characteristics to determine a lowest valid interchange rate.

Once the IRP computing device determines the lowest valid interchange rate, the IRP computing device may generate an enhanced transaction message containing the transaction data from the transaction message and an interchange rate designator (IRD) corresponding to the lowest valid interchange rate. The IRP computing device may then transmit the enhanced transaction message to another entity, such as an issuing bank or payment processor.

An IRP computing device may receive multiple transaction messages in a single batch. In such cases, the IRP computing device may perform interchange qualification, determine an IRD, and generate an enhanced transaction message for each transaction message in the batch. To the extent the enhanced transaction messages transaction are to be sent to the same destination (e.g., the same payment processor or issuing bank), the IRP computing device may group such enhanced transaction messages into a second batch for transmission.

In certain embodiments, the IRP computing device may perform interchange qualification on only a subset of transaction messages processed over a payment card network. For example, a payment card network may include both (i) acquiring banks that subscribe to an interchange qualification program provided by an operator of an IRP computing device; and (ii) non-subscribing acquiring banks that conduct their own interchange qualification. To differentiate between subscribing and non-subscribing acquiring banks, transaction messages, such as clearing messages, may include transaction data and a flag or similar indicator to have the IRP computing device perform the interchange qualification. In certain embodiments the indicator may be data contained in an IRD field of the transaction message. For example, a null IRD field or an IRD field containing only blank spaces may be an indicator that interchange qualification is to be performed by the IRP computing device.

Transaction messages to be processed by the IRP computing device may already include an IRD value in an IRD field. In such cases, the IRP computing device may validate the existing IRD value. For example, the IRP computing device may perform interchange qualification and make an independent determination of the appropriate interchange rate and corresponding IRD for a payment card transaction. The IRP computing device may then compare the IRD as determined by the IRP computing device to the existing IRD value. To the extent the IRD values differ, the IRP computing device may take remedial steps including replacing the existing IRD value in an enhanced transaction message, rejecting the transaction, alerting the acquiring bank about the discrepancy, and the like. By performing such validation, the IRP computing device may avoid rejection of invalid IRDs or may determine that a more cost-effective interchange rate is available for a given transaction.

In addition to performing interchange qualification for a payment card transaction, the IRP computing device may record or otherwise keep track of interchange qualification results and associated metrics. Data and statistics collected by the IRP computing device may then be used by the IRP computing device or an associated computing device to generate reports or similar summaries and to make such reports and summaries available to one or more of an acquiring bank, an issuing bank, a payment processor, and a merchant.

A payment processor may add new interchange rates, remove old interchange rates, or otherwise modify its interchange rate schedule. Such changes in known systems require dissemination of the updated interchange rate schedule to all acquiring banks and subsequent updating of the interchange qualification systems of each acquiring bank by the acquiring banks themselves. In contrast, in embodiments of IRP systems according to this disclosure the process of implementing updates to interchange rate schedules is greatly simplified because such changes need only be applied to the interchange schedule data of the IRP computing device. As a result, the time required to implement new or updated rate schedules and the reliability of such implementation is significantly improved. Moreover, modifying only the interchange schedule data of the IRP computing device obviates the need to disseminate updated interchange rule schedules to acquiring banks, reducing network bandwidth use and improving overall network performance.

Example of Payment Card Transaction Network

FIG. 1 is a schematic diagram illustrating an example multi-party payment card industry system 20 for processing payment card transactions in communication with an interchange rate processing (IRP) computing device 34. Embodiments described herein may relate to a payment card system, such as a payment card payment system using the MasterCard® interchange network. The MasterCard® interchange network is a set of proprietary communications standards promulgated by MasterCard International Incorporated for the exchange of financial transaction data and the settlement of funds between financial institutions that are associated with MasterCard International Incorporated. (MasterCard is a registered trademark of MasterCard International Incorporated located in Purchase, N.Y.).

In a typical payment card system, a financial institution referred to as the "issuer" issues a payment card, such as a credit card, debit card, and the like, to the consumer or account holder 22, who uses the payment card to tender payment for a purchase from merchant 24. To accept payment with the payment card, merchant 24 normally establishes an account with a financial institution that is part of the financial payment system. This financial institution is referred to as the "merchant bank," the "acquiring bank," or the "acquirer." In one embodiment, account holder 22, also referred to as cardholder, tenders payment for a purchase using a payment card at a transaction processing device 40 (e.g., a point of sale device), and merchant 24 then requests authorization from a merchant bank 26 for the amount of the purchase. The request is usually performed through the use of a point-of-sale terminal, which reads account information from a magnetic stripe, a chip, embossed characters, and the like, included on the payment card of the account holder 22 and communicates electronically with the transaction processing computers of merchant bank 26. Alternatively, merchant bank 26 may authorize a third party to perform transaction processing on its behalf. In this case, the point-of-sale terminal may be configured to communicate with the third party. Such a third party may be referred to as a "merchant processor," an "acquiring processor," or a "third party processor."

Using an interchange network 28, computers of merchant bank 26 or merchant processor may communicate with computers of an issuer bank 30 to determine whether account 32 of account holder 22 is in good standing and whether the purchase is covered by an available credit line of the account 32 corresponding to account holder 22. Based on these determinations, the request for authorization may be declined or accepted. If the request is accepted, an authorization code may be issued to merchant 24.

When a request for authorization is accepted, the available credit line of the account holder 22 is decreased, that is, account 32 is decreased. A charge for a payment card transaction may not be posted immediately to account 32 of the account holder 22 because payment networks, such as MasterCard International Incorporated, may have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If account holder 22 cancels a transaction before it is captured, a "void" is generated. If account holder 22 returns goods after capture of the transaction, a "chargeback" is generated. Interchange network 28 and/or issuer bank 30 stores the payment card information, such as a type of merchant, amount of purchase, date of purchase, in a database.

After a purchase has been made, a clearing process occurs to transfer additional transaction data related to the purchase among the parties to the transaction, such as merchant bank 26, interchange network 28, and issuer bank 30. According to various aspects herein, during the clearing process, additional data (i.e., addendum data), may be added to the transaction data. Accordingly, addendum data may be associated with a transaction and transmitted between parties to the transaction as transaction data, and may be stored by any of the parties to the transaction.

According to embodiments of the present disclosure, an interchange rate processing (IRP) computing device 34 may perform interchange qualification for payment card transaction processed in multi-party payment card industry system 20. Interchange qualification generally includes determining the appropriate interchange rate to apply to a payment card transaction based on characteristics of the payment card transaction. In some embodiments, interchange qualification may occur during the clearing process. For example, merchant bank 26 may send a clearing message to IRP computing device 34 containing transaction data corresponding to a payment card transaction between merchant 24 and accountholder 40. IRP computing device 34 may then identify the transaction characteristics of the payment card transaction and apply the transaction characteristics to an interchange rate schedule to determine the interchange rate that applies to the payment card transaction. IRP computing device 34 may then generate an enhanced transaction or clearing message including the transaction data and an interchange rate designator (IRD) corresponding to the interchange rate and transmit the enhanced transaction or clearing message to interchange network 28 or issuer 30.

After a transaction is authorized and cleared, the transaction may be settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Payment card transactions are subject to various fees paid to issuer bank 30, merchant bank 26, and interchange network 28 which are deducted or discounted from funds transferred during the settlement process. Interchange fees, for example, are paid to or deducted from the total amount transferred from issuer bank 30 and generally cover issuer bank 30's costs of handling a payment card transaction and the risk inherent in providing credit to accountholder 22. To calculate an interchange fee due to issuer bank 30 for a particular payment card transaction, issuer bank 30 may examine the IRD included in the enhanced transaction message corresponding to the payment card transaction, look up the interchange rate corresponding to the IRD, and calculate the interchange fee due to issuer bank 30 based on the interchange rate. The interchange fee may then be deducted from any funds transferred to merchant bank 26 and merchant 24.

Example of an Interchange Rate Processing System

Figure 2:
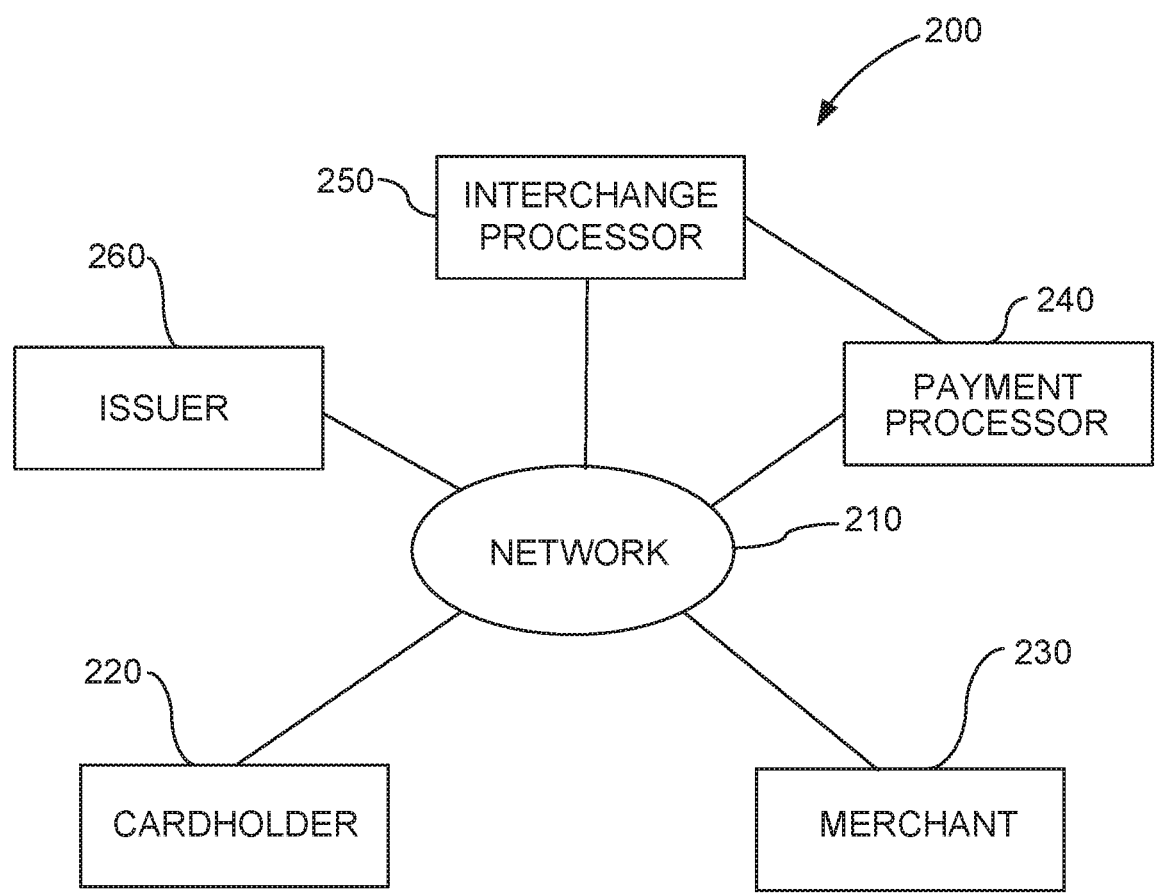
FIG. 2 is a diagram illustrating an interchange rate processing system including the interchange rate processing computing device shown in FIG. 1.

FIG. 2 is a diagram illustrating an interchange rate processing (IRP) system including a cardholder, a merchant, a payment processor, an issuer, and an interchange processor, which may correspond to an IRP computing device in accordance with an example embodiment of the present disclosure.

Referring to FIG. 2, IRP system 200 includes computing devices that respectively represent a cardholder 220, a merchant 230, a payment processor 240, an interchange processor 250, and an issuing bank ("issuer") 260 which are connected to each other via network 210. Network 210 may include the Internet and/or one or more other networks. For example, a connection between the computing devices may include a wireless network, a wired network, a telephone network, a cable network, a combination thereof, and the like. Examples of a wireless network include networks such as WiFi, WiMAX, WiBro, LAN, PAN, MAN, cellular, Bluetooth, and the like.

Cardholder 220 may be a computing device, for example, a mobile phone, a smart phone, a telephone, a computer, a laptop, a desktop, a tablet, an MP3 player, a digital assistant, a server, and the like. Cardholder 220 may access a website that corresponds to the merchant 230 or that is hosted by merchant 230, may contact a phone number of merchant 230, and the like. Cardholder 220 may also make a purchase from merchant 230.

In response to cardholder 220 entering into a transaction with merchant 230, transaction data corresponding to the transaction may be provided to payment processor 240 for authorization. For example, the payment processor 240 may be a processing entity such as MASTERCARD®, VISA®, AMERICAN EXPRESS®, and the like. Issuer 260 may be a third-party bank that issued a payment card to cardholder 220. For example, issuer 260 may correspond to payment processor 240. When cardholder 220 attempts to authorize a transaction using an account associated with a payment card issued by issuer 260, merchant 230 may transmit the transaction data to payment processor 240 to determine whether cardholder 220 has a sufficient amount of money in their account to cover the cost of the transaction. In response, payment processor 240 may verify with issuer 260 that cardholder 220 has sufficient funds.

The lifecycle of the transaction may include an authorization process, a clearing process, and a settlement process. During the authorization process, transaction data for authorizing the transaction may be transmitted between merchant 230, payment processor 240, and issuer 260. For example, the transaction data may include a name, an account number, a transaction amount, a date and/or a time of the transaction, and the like. At this point in the transaction, the transaction data included in the authorization process may be only that data which is necessary to approve the transaction. Payment processor 240 may verify with the issuer 260 that cardholder 220 has sufficient funds in their account to cover a cost of the transaction.

When the transaction is authorized by issuer 260, the issuer 260 may send notice of the authorization to payment processor 240, which may in turn transmit the notice to merchant 230. This process typically occurs within a few seconds to a few minutes of the request to authorize the transaction. After the transaction has been authorized, the transaction may be forwarded to the payment processor 240 for settlement typically later that same day, week, and the like. The settlement process includes the money being transferred from a cardholder's bank to a merchant's bank. During settlement, prior to settlement, and/or after settlement, a clearing process occurs for the transaction. The clearing process typically includes arranging bank/credit accounts for transfer of money/securities. For example, the clearing process may include payment processor 240 validating information and approving the purchase information from the merchant 230. According to various aspects, during the clearing process, the transaction data obtained during authorization may be supplemented with addendum data by the merchant 230, the payment processor 240, and the like. The clearing process may be completed after the authorization of the transaction is completed, for example, at the end of the same business day, one day later, two days later, and the like.

Addendum data may be added during a transaction lifecycle, for example, during the clearing process (if not included in the authorization process) and may include additional information about a transaction, one or more items purchased in the transaction, merchant information, cardholder information, and the like, which was not available during the authorization process. As another example, the addendum data may include information that was available during the authorization process but that was not processed during the authorization process. As yet another example, the addendum data may include information subsequently added to the transaction after the authorization process, and the like. Also, as described herein, transaction data may include authorization data and addendum data. In some examples, the authorization data and the addendum data may partially overlap, or not overlap at all. In some cases, the addendum data may be added, or partially added during the authorization process. As another example, the addendum data may be added after the authorization process.

Addendum data added to transaction data during the clearing process may include an interchange rate designator (IRD). An IRD is generally an identifier corresponding to an interchange rate applicable to the transaction based on characteristics of the transaction. Transaction characteristics which may be used to determine an applicable interchange rate may include, but are not limited to, whether the payment card transaction was made with a debit or credit card; the amount of the transaction; the nature of the goods and services purchased; whether the transaction was conducted online or at a brick and mortar location such that the payment card was physically presented; the payment program or service enrolled in by the merchant; whether the transaction was processed entirely electronically; and the location of the transaction (e.g., domestic or international). The IRD may be used by an entity within a payment processing network, such as issuer 260, to determine the applicable interchange rate and to calculate the interchange fee to which the entity is entitled.

According to various exemplary aspects, interchange rate processor 250 may perform interchange qualification to determine an interchange rate applicable to a payment card transaction. Interchange rate processor 250 may be coupled to or included within payment processor 240, issuer 260, merchant 230, and the like. Interchange rate processor 250 may also be a separate, standalone device connected to one or more of the other computing devices through network 210.

Interchange rate processor 250 may receive transaction messages containing transaction data from payment processor 240, issuer 260, merchant 230, and any other computing device within IRP system 200. Interchange rate processor 250 may then perform interchange qualification by identifying and analyzing transaction characteristics of the transaction data. Analysis of the transaction characteristics may include applying interchange qualification rules or performing lookups in data tables based on the transaction characteristics. After determining the appropriate interchange rate, interchange rate processor 250 may identify a corresponding IRD and generate an enhanced transaction message containing the transaction data and the IRD. Interchange rate processor 250 may then transmit the enhanced transaction message to another device in IRP system 200.

Example of an Interchange Rate Processing Computing Device

Figure 3:
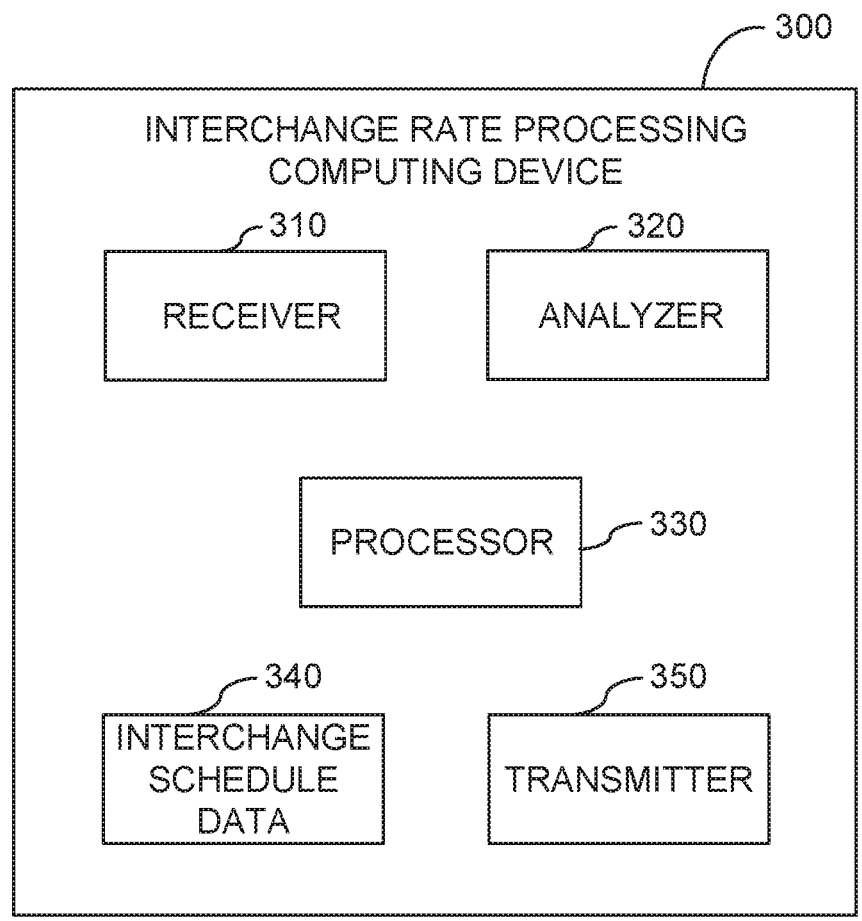
FIG. 3 is a diagram illustrating an example of an interchange rate processing computing device as shown in FIG. 2.

FIG. 3 is a diagram illustrating an example embodiment of an IRP computing device 300 that may be included in the IRP system of FIG. 2 in accordance with an example embodiment of the present disclosure.

Referring to FIG. 3, IRP computing device 300 may correspond to interchange rate processor 250 of FIG. 2. IRP computing device 300 may be coupled to payment processor 240 or may be a separate computing device included in IRP system 200 and may be connected to one or more other computing devices via network 210. In this example, IRP computing device 300 includes a receiver 310, an analyzer 320, a processor 330, interchange schedule data 340, and a transmitter 350. IRP computing device 300 may include additional components not shown or fewer components than depicted. Also, one or more of the components in this example may be combined or may be replaced by processor 330. The computer components described herein (e.g., receiver 310, analyzer 320, processor 330, interchange schedule data 340, and transmitter 350) may include hardware and/or software that are specially configured or programmed to perform the steps described herein.

Receiver 310 generally receives incoming transaction messages sent over an IRP system, such as IRP system 200 of FIG. 2. Receiver 310 may receive such transaction messages from another computing device, such as a computing device of an acquiring bank, via one or more network connections, a direct connection, and the like.

Transaction messages received by receiver 310 may include transaction data corresponding to payment card transactions made by a cardholder with a merchant. Transaction data for a payment card transaction may include one or more transaction characteristics describing the nature of the transaction. Transaction characteristics may include, but are not limited to, whether the transaction was made with a debit or credit card; the amount of the transaction; the nature of the goods and services purchased during the transaction; whether the transaction was conducted online or at a brick and mortar location such that the payment card was physically presented during the transaction; the payment program or service enrolled in by the merchant; whether the transaction was processed entirely electronically; and the location of the transaction (e.g., domestic or international).

A transaction message received by receiver 320 may be analyzed by IRP computing device 300 to determine an interchange rate for the payment card transaction corresponding to the transaction message. For example, analyzer 320 may identify transaction characteristics from the transaction data contained in the transaction message and identify an interchange rate based on the identified transaction characteristics.

To determine an interchange rate, analyzer 320 may access interchange schedule data 340. Interchange schedule data 340 is based, at least in part, on an interchange schedule. Interchange schedules are generally compiled and maintained by payment processors and may be used to determine the appropriate interchange rate for a transaction. In known systems, payment processors disseminate interchange schedules to in-network acquiring banks. When an in-network acquiring bank receives a new interchange schedule, it must update its interchange qualification system to reflect any changes embodied by the new interchange schedule. In contrast, IRP computing device 300 may be connected to a plurality of acquiring banks and may perform interchange qualification on behalf of each of the plurality of acquiring banks. Accordingly, updates and modifications to interchange schedules need only be applied to IRP computing device 300 and, more specifically, to interchange schedule data 340.

In certain embodiments, interchange schedule data 340 may include a series of interchange qualification rules derived from an interchange schedule provided by a payment processor. Analyzer 320 may apply the interchange qualification rules to the transaction characteristics of each payment card transaction to identify one or more valid interchange rates. Interchange schedule data 340 may also include one or more data tables accessible by analyzer 320. For example, analyzer 320 may perform look up functions in one or more data tables of interchange schedule data 340 based on transaction characteristics to identify one or more valid interchange rates. If analyzer 320 identifies more than one valid interchange rate, analyzer 320 or processor 330 may select the lowest interchange rate of the valid interchange rates as a final interchange rate for the payment card transaction.

Interchange schedule data 340 may be modified as new payment card products are added or existing payment card products are discontinued or modified. When a new payment card product is created, for example, interchange schedule 340 may be supplemented with new rules or new data tables or data table entries corresponding to the interchange rate of the new payment card product. Similarly, if a payment card product is discontinued rules, data tables, or data table entries corresponding to the discontinued payment card product may be removed from interchange schedule data 340. If a payment card product is modified, such as by increasing or decreasing a percentage-based interchange fee, the corresponding rules or entries of interchange schedule data 340 may be updated. Although interchange schedule data 340 is depicted in FIG. 3 as being a component of IRP computing device 300, in other embodiments, interchange schedule data 340 may be incorporated into one or more other devices in IRP systems such as a payment processor computing device.

In addition to determining a lowest valid interchange rate, analyzer 320 may also identify an interchange rate designators (IRDs) corresponding to the lowest valid interchange rate. IRDs may be codes or other shorthand representations of specific interchange rates. For example, IRDs may be numerical indices corresponding to interchange rates. Accordingly, the interchange rate associated with an IRD may be determined by, for example, performing a lookup of the IRD in a table of IRD and interchange rate pairings.

Functions of IRP computing device 300 and components thereof may be performed in whole or in part by processor 330. For example, processor 330 may be configured to assist or otherwise perform the analysis tasks of analyzer 320. In certain embodiments, processor 330 may perform additional functions including, but not limited to, updating interchange schedule data 340, installing software or firmware updates, monitoring performance of IRP computing device 300, and logging statistics related to interchange qualification performed by IRP computing device 300. In one embodiment, processor 330 may log data corresponding to the interchange rates and/or IRDs of transactions processed by IRP computing device 300. The logged data may then be used to generate reports or to otherwise provide business intelligence regarding fees paid out/collected, payment card usage, and similar metrics. Such logging and reporting may be done on an acquiring bank-by-acquiring bank basis such that reports for in-network acquiring banks may be periodically generated and disseminated.

After analyzer 320 and/or processor 330 determine an interchange rate and IRD for a transaction, processor 330 may generate an enhanced transaction message containing the transaction data of the payment card transaction and corresponding IRD. Transmitter 350 may then transmit the enhanced transaction message from IRP computing device 300 to another computing device, such as a computing device of a payment processor, via one or more network connections, a direct connection, and the like.

Example of a Method for Interchange Rate Processing

Figure 4:
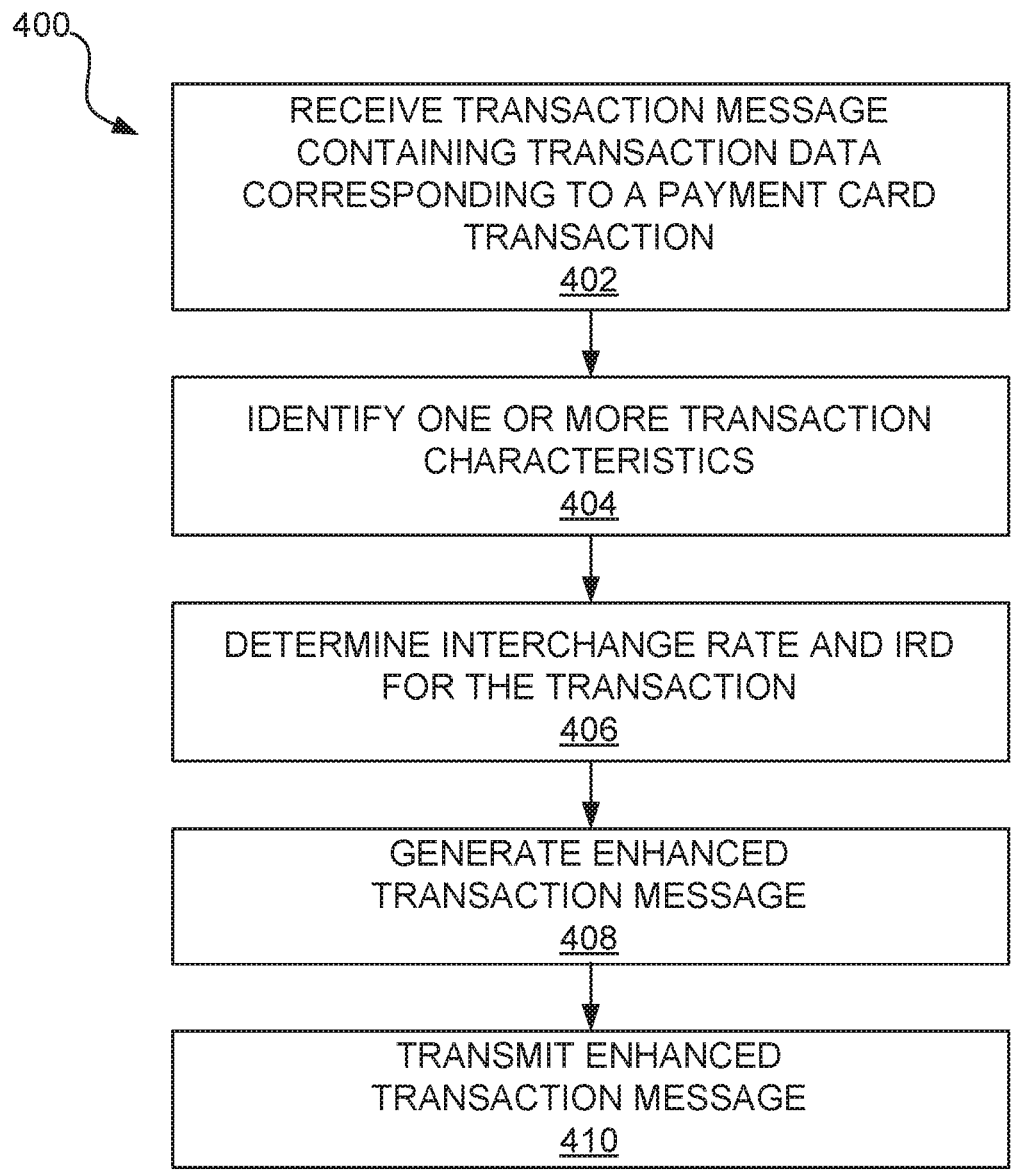
FIG. 4 is a flowchart illustrating an example method of interchange rate processing in accordance with an example embodiment of the present disclosure.

FIG. 4 is a diagram illustrating a method 400 for interchange rate processing performed by an IRP computing device, such as IRP computing device 300 of FIG. 3, according to an example embodiment of the present disclosure.

Method 400 includes receiving, by the IRP computing device, a transaction message containing transaction data corresponding to a payment card transaction 402. The transaction message may be received via a receiver of the IRP computing device such as receiver 310 of IRP computing device 300 of FIG. 3. Transaction messages received by the IRP computing device may be transmitted by an acquiring bank during a clearing process and may include transaction data corresponding to one or more payment card transactions.

After the IRP computing device receives a transaction message, it may identify one or more transaction characteristics 404 in the transaction data contained in the transaction message. Transaction characteristics may include, but are not limited to, whether the payment card transaction was made with a debit or credit card; the amount of the transaction; the nature of the goods and services purchased; whether the transaction was conducted online or at a brick and mortar location such that the payment card was physically presented; the payment program or service enrolled in by the merchant; whether the transaction was processed entirely electronically; and the location of the transaction (e.g., domestic or international). Each of these characteristics may be represented by one or more of a flag, a value, or some other indicator in the transaction data corresponding to the transaction.

Based on one or more of the transaction characteristics, the IRP computing device may determine an interchange rate and IRD for the transaction 406. To do so, the IRP computing device may include an analyzer or processor, such as analyzer 320 and processor 330 of IRP computing device 300 of FIG. 3. The analyzer may be configured to access and apply interchange schedule data stored in the IRP computing device or other computing device accessible by the IRP computing device. The interchange schedule data may include rules or data tables that may be used by the analyzer or processor to determine an interchange rate and IRD of a transaction.

The IRP computing device may determine that more than one interchange rate may be valid for a given payment card transaction. To account for this possibility, the IRP computing device may be configured to automatically select one of the valid interchange rates. For example, the IPR computing device may automatically select the lowest valid interchange rate for the payment card transaction.

An IRP computing device in accordance with this disclosure may be included in a payment processing system having a plurality of acquiring banks. Accordingly, an operator of the IRP computing device may offer interchange qualification as a service to each of the plurality of acquiring banks. Each acquiring bank may be given the option of subscribing to the service or performing its own interchange qualification. To differentiate between subscribing and non-subscribing acquiring banks, the transaction message may include a flag or other subscription indicator to indicate whether the transaction message originates from a subscribing acquiring bank. The subscription indicator may take various forms. For example, in some instances, the subscription indicator may be a flag in a subscription indicator field of the transaction message. In other instances, data in an IRD field of the transaction message may constitute the subscription indicator. For example, a null or blank value in an IRD field may indicate that the acquiring bank is a subscriber and that the IRP computing device should perform interchange qualification and provide an IRD. In contrast, if the acquiring bank populates the IRD field with a non-null or non-blank value, the IRP computing device may treat the inclusion of data in the IRD field as an indicator that the acquiring bank is not a subscriber to the interchange qualification service.

In certain embodiments, the IRP computing device may perform interchange qualification even if an IRD field of the transaction message is populated with a non-null or non-blank value. Doing so may serve to verify or correct any interchange qualification performed by an acquiring bank. For example, the IRP computing device may determine that the IRD provided is invalid, that the IRD is incorrect, or, to the extent multiple interchange rates may be applicable to a transaction, that the IRD does not correspond to the lowest valid interchange rate for the corresponding payment card transaction.

The IRP computing device may next generate an enhanced transaction message 408 that includes the transaction data and the IRD determined by the IRP computing device. To the extent the IRP computing device identifies that an existing IRD included in the transaction data is invalid, incorrect, or does not correspond to a preferred interchange rate, the IRP computing device may overwrite the existing IRD in the enhanced transaction message.

After the IRP computing device has generated the enhanced transaction message, it may transmit the enhanced transaction message 410. The IRP computing device may transmit the enhanced transaction message to any device communicatively coupled to the IRP computing device. For example, the IRP computing device may transmit the enhanced transaction message to one or both of a payment processor and an issuer bank.

Additional Considerations

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable payment card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An interchange rate processing computing device in communication with a single payment processor, an acquiring bank associated with a merchant, and an issuing bank of a payment processing network, the interchange rate processing computing device comprising one or more processors in communication with one or more memory devices, the interchange rate processing computing device configured to:
receive, from the acquiring bank, a transaction message including transaction data corresponding to a payment card transaction initiated by a cardholder with the merchant using a payment card;
identify one or more transaction characteristics of the payment card transaction from the transaction data;
apply, to the one or more transaction characteristics, interchange schedule data stored in the one or more memory devices to identify a plurality of valid interchange rates applicable to processing of the payment card transaction by the single payment processor;
automatically determine a lowest valid interchange rate applicable to the payment card transaction from the plurality of valid interchange rates;
insert, in response to the determination, an interchange rate designator (IRD) corresponding to the lowest valid interchange rate into the transaction message to generate an enhanced transaction message; and
transmit, over the payment processing network, the enhanced transaction message to the payment processor, reducing a number of transaction messages that would otherwise be transmitted over the payment processing network for processing an invalid or incorrect IRD, thereby conserving computational resources.

2. The interchange rate processing computing device of claim 1, wherein the interchange schedule data includes interchange qualification rules for determining an interchange rate applicable to the payment card transaction.

3. The interchange rate processing computing device of claim 1 wherein the transaction message includes an initial IRD, and the interchange rate processing computing device is further configured to validate the initial IRD by:
determining whether the initial IRD is equivalent to the IRD corresponding to the lowest valid interchange rate, and
inserting, based upon the determination, the IRD corresponding to the lowest valid interchange rate into the transaction message by replacing the initial IRD with the IRD corresponding to the lowest valid interchange rate.

4. The interchange rate processing computing device of claim 1, wherein the transaction message is received from the acquiring bank.

5. The interchange rate processing computing device of claim 1, wherein the interchange rate processing computing device is incorporated into the payment processor.

6. The interchange rate processing computing device of claim 1 wherein the transaction message is one of a plurality of transaction messages in a transaction message batch, each of the plurality of transaction messages corresponding to a payment card transaction initiated by a cardholder with a merchant using a payment card and including respective transaction data, the interchange rate processing computing device further configured to:
receive the transaction message batch;
identify, for each of the plurality of transaction messages of the transaction message batch, one or more transaction characteristics from the respective transaction data of each of the plurality of transaction messages;
apply, for each of the plurality of transaction messages, interchange schedule data stored in the one or more memory devices to the one or more transaction characteristics to identify a plurality of valid interchange rates applicable to a respective payment card transaction;
automatically determine a respective lowest valid interchange rate for each payment card transaction associated with the plurality of transaction messages from the plurality of valid interchange rates identified from the respective transaction data of each of the plurality of transaction messages;
insert an IRD corresponding to the respective lowest valid interchange rate into each of the plurality of transaction messages to generate, for each of the plurality of transaction messages, an enhanced transaction message; and
transmit, over the payment processing network, each of the enhanced transaction messages.

7. The interchange rate processing computing device of claim 1 wherein the transaction message further includes an indicator for indicating whether the interchange rate processing computing device is to determine an interchange rate for the payment card transaction and wherein the interchange rate processing computing device is further configured to identify the indicator in the transaction message.

8. The interchange rate processing computing device of claim 1, wherein the one or more transaction characteristics include one or more of whether the payment card transaction was made with a debit or credit card, an amount of the payment card transaction, a type of good purchased during the payment card transaction, a type of service purchased during the payment card transaction, whether the payment card transaction was conducted online, whether the payment card transaction was conducted at a brick and mortar location, a payment program enrolled in by a merchant, whether the payment card transaction was processed electronically, and a location of the payment card transaction.

9. The interchange rate processing computing device of claim 1 further configured to:
log data corresponding to the enhanced transaction message; and
generate a report based, at least in part, on the logged data.

10. A computer-implemented method for interchange rate processing, said method implemented using an interchange rate processing computing device in communication with a single payment processor, an acquiring bank associated with a merchant, and an issuing bank of a payment processing network, the interchange rate processing computing device comprising one or more processors in communication with one or more memory devices, said method comprising:
receiving, at the one or more processors, from the acquiring bank, a transaction message including transaction data corresponding to a payment card transaction initiated by a cardholder with the merchant using a payment card;
identifying, by the one or more processors, one or more transaction characteristics of the payment card transaction from the transaction data;
applying, to the one or more transaction characteristics by the one or more processors, interchange schedule data stored in the one or more memory devices to identify a plurality of valid interchange rates applicable to processing of the payment card transaction by the single payment processor;

automatically determining, by the one or more processors, a lowest valid interchange rate applicable to the payment card transaction from the plurality of valid interchange rates;

inserting, by the one or more processors, in response to the determination, an interchange rate designator (IRD) corresponding to the lowest valid interchange rate into the transaction message to generate an enhanced transaction message; and transmitting, by the one or more processors over the payment processing network, the enhanced transaction message to the payment processor, reducing a number of transaction messages that would otherwise be transmitted over the payment processing network for processing an invalid or incorrect IRD, thereby conserving computational resources.

11. The method of claim 10, wherein the interchange schedule data includes interchange qualification rules for determining an interchange rate applicable to the payment card transaction.

12. The method of claim 10, wherein the transaction message includes an initial IRD, the method further comprising validating the initial IRD by:

determining, by the one or more processors, whether the initial IRD is equivalent to the IRD corresponding to the lowest valid interchange rate; and inserting, by the one or more processors, the interchange IRD corresponding to the lowest valid interchange rate into the transaction message by replacing the initial IRD with the IRD corresponding to the lowest valid interchange rate.

13. The method of claim 10, wherein the transaction message is received from the acquiring bank.

14. The method of claim 10, wherein the transaction message is one of a plurality of transaction messages in a transaction message batch, each of the plurality of transaction messages corresponding to a payment card transaction initiated by a cardholder with a merchant using a payment card and including respective transaction data, the method further comprising:

receiving, at the one or more processors, the transaction message batch;

identifying, for each of the plurality of transaction messages of the transaction message batch by the one or more processors, one or more transaction characteristics from the respective transaction data of each of the plurality of transaction messages;

applying, for each of the plurality of transaction messages by the one or more processors, interchange schedule data stored in the one or more memory devices to the one or more transaction characteristics to identify a plurality of interchange rates applicable to a respective payment card transaction;

automatically determining, by the one or more processors, a respective lowest valid interchange rate for each payment card transaction associated with the plurality of transaction messages from the plurality of valid interchange rates identified from the respective transaction data of each of the plurality of transaction messages;

inserting, by the one or more processors, an IRD corresponding to the respective lowest valid interchange rate into each of the plurality of transaction messages to generate, for each of the plurality of transaction messages, an enhanced transaction message; and transmitting, over the payment processing network by the one or more processors, each of the enhanced transaction messages.

15. The method of claim 10, wherein the transaction message further includes an indicator for indicating whether the interchange rate processing computing device is to determine an interchange rate for the payment card transaction and the method further comprises identifying the indicator in the transaction message.

16. The method of claim 10, wherein the one or more transaction characteristics include one or more of whether the payment card transaction was made with a debit or credit card, an amount of the payment card transaction, a type of good purchased during the payment card transaction, a type of service purchased during the payment card transaction, whether the payment card transaction was conducted online, whether the payment card transaction was conducted at a brick and mortar location, a payment program enrolled in by a merchant, whether the payment card transaction was processed electronically, and a location of the payment card transaction.

17. A non-transitory computer-readable storage media having computer-executable instructions embodied thereon, when executed by an interchange rate processing computing device in communication with a single payment processor, an acquiring bank associated with a merchant, and an issuing bank of a payment processing network, the interchange rate processing computing device comprising at least one processor in communication with one or more memory devices, the computer-executable instructions cause the at least one processor to:

receive, from the acquiring bank, a transaction message including transaction data corresponding to a payment card transaction initiated by a cardholder with the merchant using a payment card;

identify one or more transaction characteristics of the payment card transaction from the transaction data;

apply, to the one or more transaction characteristics, interchange schedule data stored in the one or more memory devices to identify a plurality of valid interchange rates applicable to processing of the payment card transaction by the single payment processor;

automatically determine a lowest valid interchange rate applicable to the payment card transaction from the plurality of valid interchange rates;

insert, in response to the determination, an interchange rate designator (IRD) corresponding to the lowest valid interchange rate into the transaction message to generate an enhanced transaction message; and transmit, over the payment processing network, the enhanced transaction message to the payment processor, reducing a number of transaction messages that would otherwise be transmitted over the payment processing network for processing an invalid or incorrect IRD, thereby conserving computational resources.

18. The computer-readable storage media in accordance with claim 17, wherein the interchange schedule data includes interchange qualification rules for determining an interchange rate applicable to the payment card transaction, and wherein the computer-executable instructions further cause the at least one processor to transmit the enhanced transaction message to an issuing bank.

19. The computer-readable storage media in accordance with claim 17, wherein the transaction message is one of a plurality of transaction messages in a transaction message batch, each of the plurality of transaction messages corresponding to a payment card transaction initiated by a cardholder with a merchant using a payment card and including respective transaction data, and wherein the computer-executable instructions further cause the at least one processor to:

receive the transaction message batch;

identify, for each of the plurality of transaction messages of the transaction message batch, one or more transaction characteristics from the respective transaction data of each of the plurality of transaction messages;

apply, for each of the plurality of transaction messages, interchange schedule data stored in the one or more memory devices to the one or more transaction characteristics to identify a plurality of valid interchange rates applicable to a respective payment card transaction;

automatically determine a respective lowest valid interchange rate for each payment card transaction associated with the plurality of transaction messages from the plurality of valid interchange rates identified from the respective transaction data of each of the plurality of transaction messages;

insert an IRD corresponding to the respective lowest valid interchange rate into each of the plurality of transaction messages to generate, for each of the plurality of transaction messages, an enhanced transaction message; and transmit, over the payment processing network, each of the enhanced transaction messages.

20. The computer-readable storage media in accordance with claim 17, wherein the transaction message further includes an indicator for indicating whether the interchange rate processing computing device is to determine an interchange rate for the payment card transaction and wherein the computer-executable instructions further cause the at least one processor to identify the indicator in the transaction message.

21. The computer-readable storage media in accordance with claim 17, wherein the computer-executable instructions further cause the at least one processor to:

log data corresponding to the enhanced transaction message; and generate a report based, at least in part, on the logged data.

\* \* \* \* \*